Aug. 26, 1952     J. A. STEDMAN     2,607,999

MICROMETER CALIPER

Filed May 5, 1950

INVENTOR.

BY James A. Stedman

Nathaniel Frucht

ATTORNEY

Patented Aug. 26, 1952

2,607,999

UNITED STATES PATENT OFFICE 2,607,999
MICROMETER CALIPER
James A. Stedman, Cranston, R. I., assignor to Curtis Company, a corporation of Pennsylvania Application May 5, 1950, Serial No. 160,241

2 Claims. (Cl. 33—167)

1

The present invention relates to the construction of micrometer calipers, and has particular reference to a novel construction for facilitating the use of micrometer calipers of large range.

The principal object of the invention is to provide an anvil construction which eliminates gagging or catching on the work.

Another object of the invention is to simplify the construction of the extension standards used for length adjustment.

A further object is to compensate for inaccuracies of alignment of the extension standard parts, whereby measuring errors due to slight variations in alignment are minimized.

It has been found desirable to increase the accuracy of large range micrometer calipers, by shaping the work engaging parts to eliminate gagging and catching. To this end, I shape the anvil to provide a rounded engaging face, whereby the anvil will not gag when the micrometer caliper is adjusted to the work. I find that an arcuate face anvil is particularly suitable for use with adjustable standards, as errors resulting from a slight off-alignment of the standard is minimized; further, I find that the cost of manufacture of the parts is greatly reduced, as it is difficult to accurately square grind an anvil head for use with extension standards.

Figure 4:
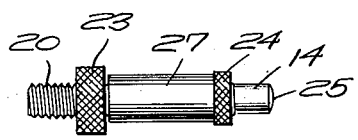
Fig. 4 is a side view of an alternative standard.

Referring to the drawings, the large range micrometer caliper 10 has the usual C-shaped frame 11 with movable head 12, and an extension standard 13 fitted with an anvil 14. The head parts include a thimble 15, barrel 16, spindle 17, and clamp ring 18, and the extension standard includes a hollow post 19 threaded at one end to receive a screw 20 adapted to seat in a threaded base in the outer frame end 21, said base being in alignment with the spindle, and threaded at the other end to receive the threaded base 22 of the anvil 14, lock nuts 23, 24 being provided to lock the post to the outer frame end and the anvil to the post. The anvil has a rounded or arcuate measuring face 25 which cooperates with the flat measuring face 26 of the spindle 17. The extension posts are of different lengths, a second length being indicated at 27 in Fig. 4, whereby a large range is provided for the micrometer caliper.

Figure 1:
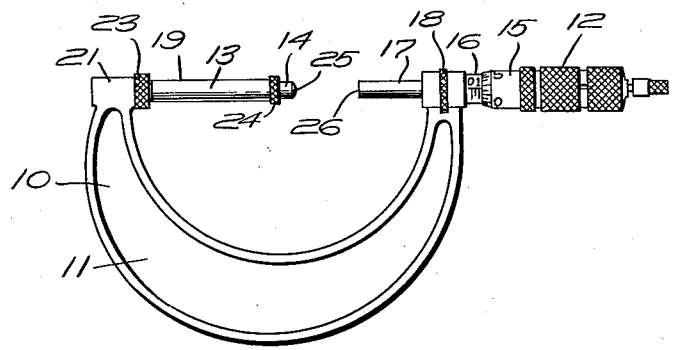
Fig. 1 is a side view of a large range micrometer caliper embodying the invention.
Figures 2, 3:
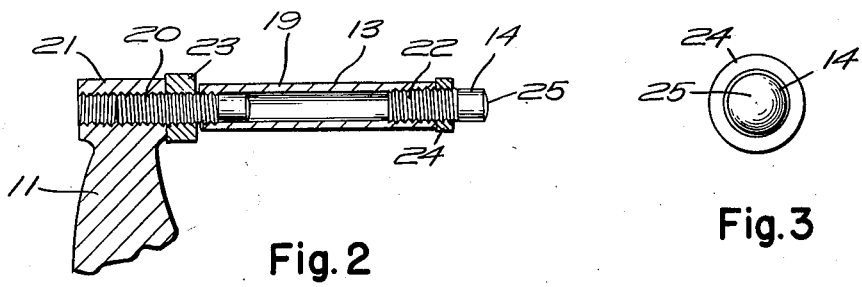
Fig. 2 is an enlarged sectional detail showing one extension standard and the anvil.
Fig. 3 is an enlarged end view of Fig. 2.

The outer parts of the micrometer caliper, see Fig. 2, include an elongated post, locked at its outer end to the frame outer end, and carrying an anvil having a base of small length at its inner or measuring end. Since these parts must be in exact axial alignment with the spindle to register accurately, changes in alignment due to slight errors in machining or accidental blows, impacts

2 and wear cause the usual flat type anvil to tilt slightly, whereby the instrument gags when adjusted to the work; this is particularly true when the work is slightly rough or unfinished.

The slightly rounded end of the anvil thus makes the micrometer caliper more suitable for usual shop measurments as a slight rocking motion when setting the instrument is permissible. If desired, the measuring end of the spindle may be rounded; the grinding of a flat measuring surface on the spindle, however, is not too difficult, whereas the grinding of a flat measuring surface is time-consuming, whereby the use of an arcuate end on the anvil reduced manufacturing cost.

Although I have described a specific embodiment of my invention, it is obvious that changes in the shape and relation of the parts may be made to meet the requirements for different micrometer caliper needs, without departing from the spirit and the scope of the invention as defined in the appended claims.

I claim:

1. In a micrometer caliper, a U-shaped frame having a manually movable spindle at one end, the frame having a threaded bore at the other end in alignment with said spindle, a screw element threaded in said bore, a hollow post internally threaded at one end and threaded on said screw element, said post being internally threaded at the other end, and an anvil having a threaded base threaded into said post other end, said spindle and said anvil having measuring surfaces, at least one of said measuring surfaces being rounded.

2. In a micrometer caliper, a U-shaped frame having a manually movable spindle at one end, the frame having a threaded bore at the other end in alignment with said spindle, a screw element threaded in said bore, a hollow post internally threaded at one end and threaded on said screw element, said post being internally threaded at the other end, and an anvil having a threaded base threaded into said post other end, said spindle and said anvil having measuring surfaces, said anvil measuring surface being rounded.

JAMES A. STEDMAN.

REFERENCES CITED

The following references are of record in the file of this patent:

UNITED STATES PATENTS

| Number | Name | Date |
|---|---|---|
| 826,883 | Prewett | July 24, 1906 |
| 1,234,342 | Johnson | July 24, 1917 |
| 1,540,473 | Hitchcock | June 2, 1925 |
| 1,646,393 | De la Mater | Oct. 5, 1927 |

FOREIGN PATENTS

| Number | Country | Date |
|---|---|---|
| 419,678 | Great Britain | Nov. 16, 1934 |